(12) United States Patent
Kim et al.

(10) Patent No.: US 12,032,829 B2
(45) Date of Patent: Jul. 9, 2024

(54) MEMORY DEVICE PERFORMING IN-MEMORY OPERATION AND METHOD THEREOF

(71) Applicant: SAMSUNG ELECTRONICS CO., LTD., Suwon-si (KR)

(72) Inventors: Seon Wook Kim, Namyangju-si (KR); Yoonah Paik, Seoul (KR); Changhyun Kim, Seongnam-si (KR); Won Jun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/861,569

(22) Filed: Jul. 11, 2022

(65) Prior Publication Data

US 2023/0028952 A1    Jan. 26, 2023

(30) Foreign Application Priority Data

Jul. 21, 2021 (KR) .................. 10-2021-0095294
Feb. 11, 2022 (KR) .................. 10-2022-0018015

(51) Int. Cl.
*G06F 3/06* (2006.01)

(52) U.S. Cl.
CPC .......... *G06F 3/0611* (2013.01); *G06F 3/0659* (2013.01); *G06F 3/0673* (2013.01)

(58) Field of Classification Search
CPC .... G06F 3/0611; G06F 3/0659; G06F 3/0673; G06F 3/0679; G06F 3/061; G06F 15/7821; Y02D 10/00
See application file for complete search history.

(56) References Cited

U.S. PATENT DOCUMENTS

| | | |
|---|---|---|
| 11,139,033 B2 | 10/2021 | Seo et al. |
| 11,237,799 B2 | 2/2022 | Lee |
| 11,301,399 B2 | 4/2022 | Kwon et al. |
| 11,379,149 B2 | 7/2022 | Kim et al. |

(Continued)

FOREIGN PATENT DOCUMENTS

| | | |
|---|---|---|
| KR | 10-2007-0108827 A | 11/2007 |
| KR | 101843243 B1 | 3/2018 |

(Continued)

OTHER PUBLICATIONS

Khushal Sethi ey al., Efficient On-Chip Communication for Parallel Graph-Analytics on Spatial Architectures, IEEE 2021.

(Continued)

*Primary Examiner* — Jason W Blust
(74) *Attorney, Agent, or Firm* — Sughrue Mion, PLLC

(57) ABSTRACT

Disclosed is a memory device including a plurality of memory banks, each of which performs an operation based on first operand data including pieces of first unit data and second operand data including pieces of second unit data and a processing in-memory interface unit (PIM IU) that delivers signals for an operation request to the plurality of memory banks. Each of the plurality of memory banks includes a memory cell array configured to store one of the pieces of first unit data and a PIM engine that reads the one of the pieces of first unit data from the memory cell array, reads the pieces of second unit data broadcast to the plurality of memory banks, and generates an operation result by performing an operation based on the one of the pieces of first unit data and the pieces of second unit data.

20 Claims, 11 Drawing Sheets

(56) References Cited

U.S. PATENT DOCUMENTS

| | | | |
|---|---|---|---|
| 2007/0271325 A1 | 11/2007 | Juffa et al. | |
| 2016/0224465 A1* | 8/2016 | Morad | G06F 9/3887 |
| 2018/0246855 A1 | 8/2018 | Redfern et al. | |
| 2019/0096453 A1* | 3/2019 | Shin | G06F 7/523 |
| 2020/0183837 A1 | 6/2020 | Gu et al. | |
| 2021/0072986 A1 | 3/2021 | Yudanov et al. | |
| 2021/0208894 A1* | 7/2021 | Song | G06F 9/3001 |
| 2021/0216243 A1 | 7/2021 | Shin et al. | |
| 2021/0247978 A1 | 8/2021 | Malladi et al. | |
| 2022/0076737 A1* | 3/2022 | Cosemans | G06J 1/00 |

FOREIGN PATENT DOCUMENTS

| | | |
|---|---|---|
| KR | 10-2020-0070089 A | 6/2020 |
| KR | 10-2020-0108768 A | 9/2020 |
| KR | 10-2020-0129843 A | 11/2020 |
| KR | 10-2021-0042757 A | 4/2021 |
| KR | 10-2021-0051363 A | 5/2021 |
| KR | 10-2021-0063496 A | 6/2021 |

OTHER PUBLICATIONS

Chang Hyun Kim et al., "Silent-PIM: Realizing the Processing-in-Memory Computing with Standard Memory Requests", IEEE TPDS, Mar. 2021.

Mingxuan He et. al., "Newton: A DRAM-maker's Accelerator-in-Memory (AiM) Architecture for Machine Learning," IEEE/ACM MICRO 2020.

Byeongho Kim et al., "MVID: Sparse Matrix-Vector Multiplication in Mobile DRAM for Accelerating Recurrent Neural Networks," IEEE TC, Jul. 2020.

Cho, et al. "MdDRAM v2: In-Dynamic Random Access Memory Systolic Array Accelerator to Address the Large Model Problem in Deep Neural Networks on the Edge," IEEE Access, vol. 8, pp. 135223-135243 (2020).

Communication dated May 14, 2024, issued by the Korean Intellectual Property Office in Korean Patent Application No. 10-2022-0018015.

* cited by examiner

FIG. 4

$$C = \begin{bmatrix} \overbrace{\begin{pmatrix} a_{0,0} \\ a_{1,0} \\ \vdots \\ a_{31,0} \end{pmatrix}}^{T0} & \overbrace{\begin{pmatrix} a_{0,1} \\ a_{1,1} \\ \vdots \\ a_{31,1} \end{pmatrix}}^{T1} & \cdots & \overbrace{\begin{pmatrix} a_{0,31} \\ a_{1,31} \\ \vdots \\ a_{31,31} \end{pmatrix}}^{T31} \end{bmatrix} \times \begin{bmatrix} \overbrace{\begin{pmatrix} b_{0,0} \\ b_{1,0} \\ \vdots \\ b_{31,0} \end{pmatrix}}^{Bank0} & \overbrace{\begin{pmatrix} b_{0,1} \\ b_{1,1} \\ \vdots \\ b_{31,1} \end{pmatrix}}^{Bank1} & \cdots & \overbrace{\begin{pmatrix} b_{0,15} \\ b_{1,15} \\ \vdots \\ b_{31,15} \end{pmatrix}}^{Bank15} \end{bmatrix}$$

A          B

FIG. 8A
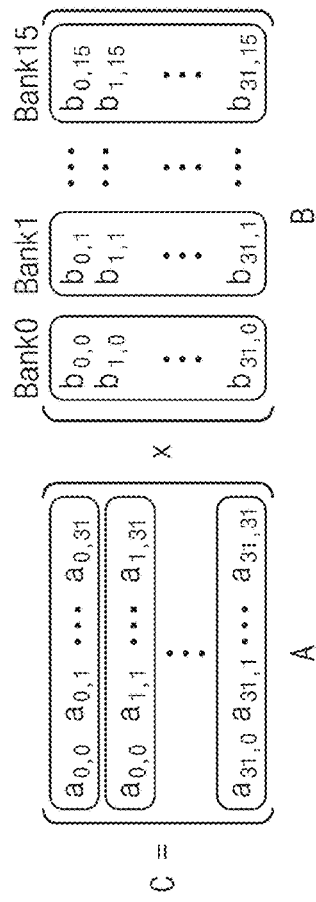
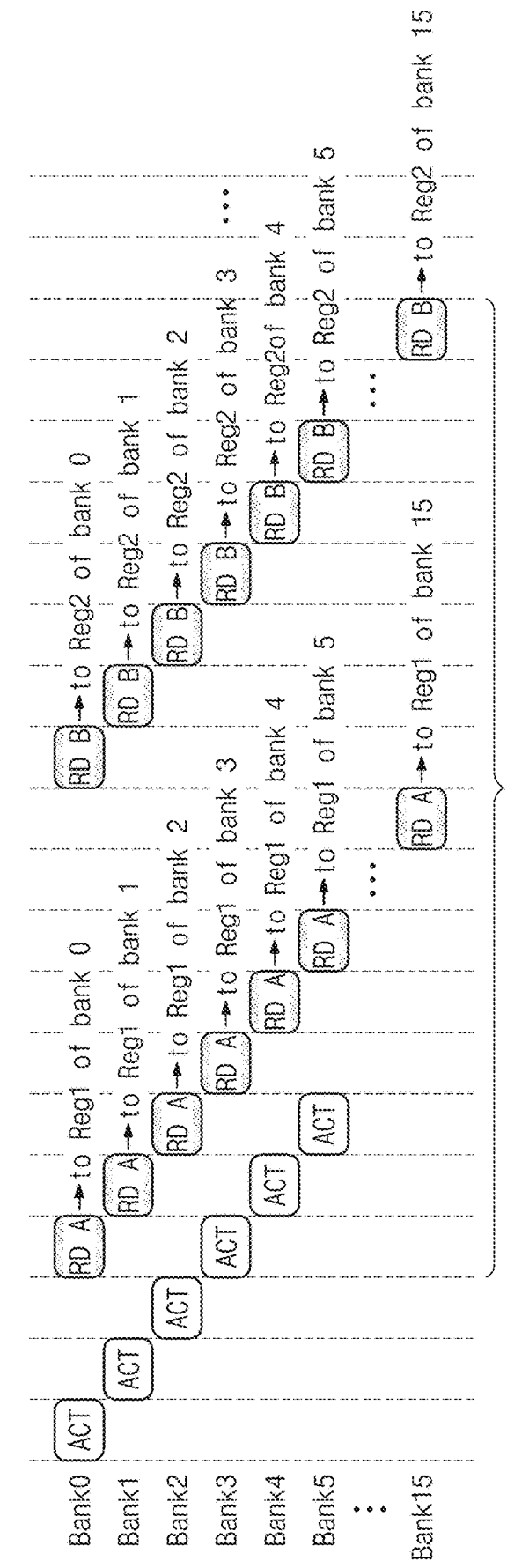

MEMORY DEVICE PERFORMING IN-MEMORY OPERATION AND METHOD THEREOF

CROSS-REFERENCE TO RELATED APPLICATIONS

This application claims priority under 35 U.S.C. § 119 to Korean Patent Application No. 10-2021-0095294 filed on Jul. 21, 2021, and No. 10-2022-0018015 filed on Feb. 11, 2022, in the Korean Intellectual Property Office, the disclosures of which are incorporated by reference herein in their entireties.

BACKGROUND

Embodiments of the present disclosure described herein relate to a memory device, and more particularly, relate to a memory device for performing an in-memory operation, and a method thereof.

Von Neumann architecture, which is a conventional computing structure, includes a central processing unit (CPU) including an operation unit and a main memory storing data required for operations. A cache memory, which has a low-capacity and high-speed and which is used to quickly access data frequently used for operations, is present in the CPU. Data read from a main memory is stored in the cache memory. When the cache memory is full, the least-recently used data is evicted. When data required for operations is present in the cache memory, the data is quickly supplied from the cache memory. When data required for operations is not present in the cache memory, the corresponding data needs to be read from the main memory.

Data used in the latest applications to which schemes such as deep learning and an artificial neural network are applied have a very large capacity and low locality. When the latest application is executed in the conventional Von Neumann computing architecture optimized for data operation having high locality, unnecessary data movement and memory bottlenecks occur. In other words, because data having low locality is stored in a cache memory which is used for quick access to reused data, the cache memory is not used efficiently, and the large amount of data required for operations needs to be read from a main memory, not the cache memory. One of the methods for solving this problem is an in-memory operation.

The in-memory operation refers to an operation of performing operations in the main memory and transmitting only the operated result to a CPU while a simple operation unit is installed inside a memory device. The conventional in-memory operation includes a per-bank method of reading one or more operands, storing the one or more operands in a register inside of each bank of a memory device, and reading the remaining operands in the memory cells of each bank to perform operations, and an all-bank method of simultaneously executing all banks in a process of reading and calculating operands from memory cells of each bank. However, as for the per-bank method, because operations of each bank are executed sequentially, the execution time becomes longer. As for the all-bank method, power consumption is high and a memory controller supporting simultaneous operations of all banks is required.

SUMMARY

Embodiments of the present disclosure provide a memory device that performs an in-memory operation by using an operand shared by all banks, and an operation method thereof.

According to an embodiment, a memory device includes a plurality of memory banks, each of which performs an operation based on first operand data including pieces of first unit data and second operand data including pieces of second unit data and a processing in-memory interface unit (PIM IU) that delivers signals for an operation request to the plurality of memory banks. Each of the plurality of memory banks includes a memory cell array configured to store one of the pieces of first unit data and a PIM engine that reads the one of the pieces of first unit data from the memory cell array, reads the pieces of second unit data broadcast to the plurality of memory banks, and generates an operation result by performing an operation based on the one of the pieces of first unit data and the pieces of second unit data.

According to an embodiment, a memory device includes a plurality of memory banks, each of which performs matrix multiplication on a first matrix including a plurality of first columns and a second matrix including a plurality of second columns, and a PIM IU configured to deliver signals for an operation request to the plurality of memory banks. Each of the plurality of memory banks includes a memory cell array that stores one of the plurality of first columns and a PIM engine that reads the one of the plurality of first columns from the memory cell array, reads the plurality of second columns broadcast to the plurality of memory banks, and generates an operation result by performing an operation based on the one of the plurality of first columns and the plurality of second columns.

According to an embodiment, a method for performing an operation based on first operand data including pieces of first unit data and second operand data including pieces of second unit data includes reading one of the pieces of first unit data from a memory cell array, reading the pieces of second unit data broadcast to a plurality of memory banks, and performing an operation based on the one of the pieces of first unit data and the pieces of second unit data.

BRIEF DESCRIPTION OF THE FIGURES

The above and other objects and features of the present disclosure will become apparent by describing in detail embodiments thereof with reference to the accompanying drawings.

FIG. 4 shows an example of an in-memory operation, according to an embodiment of the present disclosure.

FIG. 8A shows an example of a per-bank in-memory operation.

DETAILED DESCRIPTION

Hereinafter, embodiments of the present disclosure will be described in detail and clearly to such an extent that an ordinary one in the art easily implements the present disclosure.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
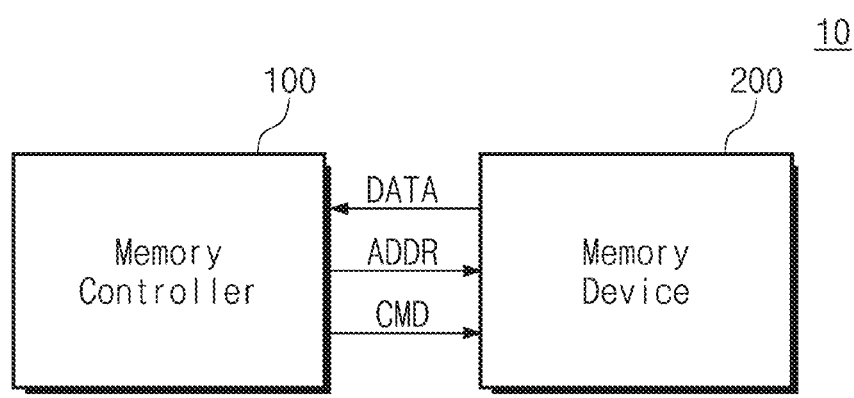
FIG. 1 shows an example of a configuration of a memory system, according to an embodiment of the present disclosure.

FIG. 1 shows an example of a configuration of a memory system 10, according to an embodiment of the present disclosure. The memory system 10 may include a memory controller 100 and a memory device 200.

The memory controller 100 may be electrically connected to the memory device 200 and may control the memory device 200 depending on a request or control of an external device (e.g., a host, a CPU, an application processor (AP), or the like). The memory controller 100 may transmit a command CMD and an address ADDR to the memory device 200 to store data DATA in the memory device 200 or to read the data DATA stored in the memory device 200. For example, the memory controller 100 and the memory device 200 may exchange the data DATA with each other through a DDR interface.

For example, the memory controller 100 may transmit the command CMD and the address ADDR to the memory device 200 and may control an operand and the type of an operation performed in the memory device 200. For example, the command CMD may include a signal (a PRE signal) for pre-charging the memory device 200, a signal (an ACT signal) for activating the memory device 200, a signal (an RD signal) for reading out data, and a signal (a WR signal) for writing data. For example, the memory controller 100 of the present disclosure may be implemented inside a host processor (not shown).

In response to signals received from the memory controller 100, the memory device 200 may store the data DATA or may provide the stored data DATA to the memory controller 100. The memory device 200 may perform various operations including an in-memory operation based on the data DATA, the command CMD, and the address ADDR that are output from the memory controller 100.

For example, the memory device 200 may include a dynamic RAM (DRAM), and the memory controller 100 may be implemented as a DRAM controller. However, the present disclosure is not limited thereto. For example, the memory device 200 may include at least one of various memory devices such as an NAND flash memory, a static RAM (SRAM), a synchronous DRAM (SDRAM), a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), etc. Moreover, the memory controller 100 may be variously implemented depending on the type of the memory device 200.

Figure 2:
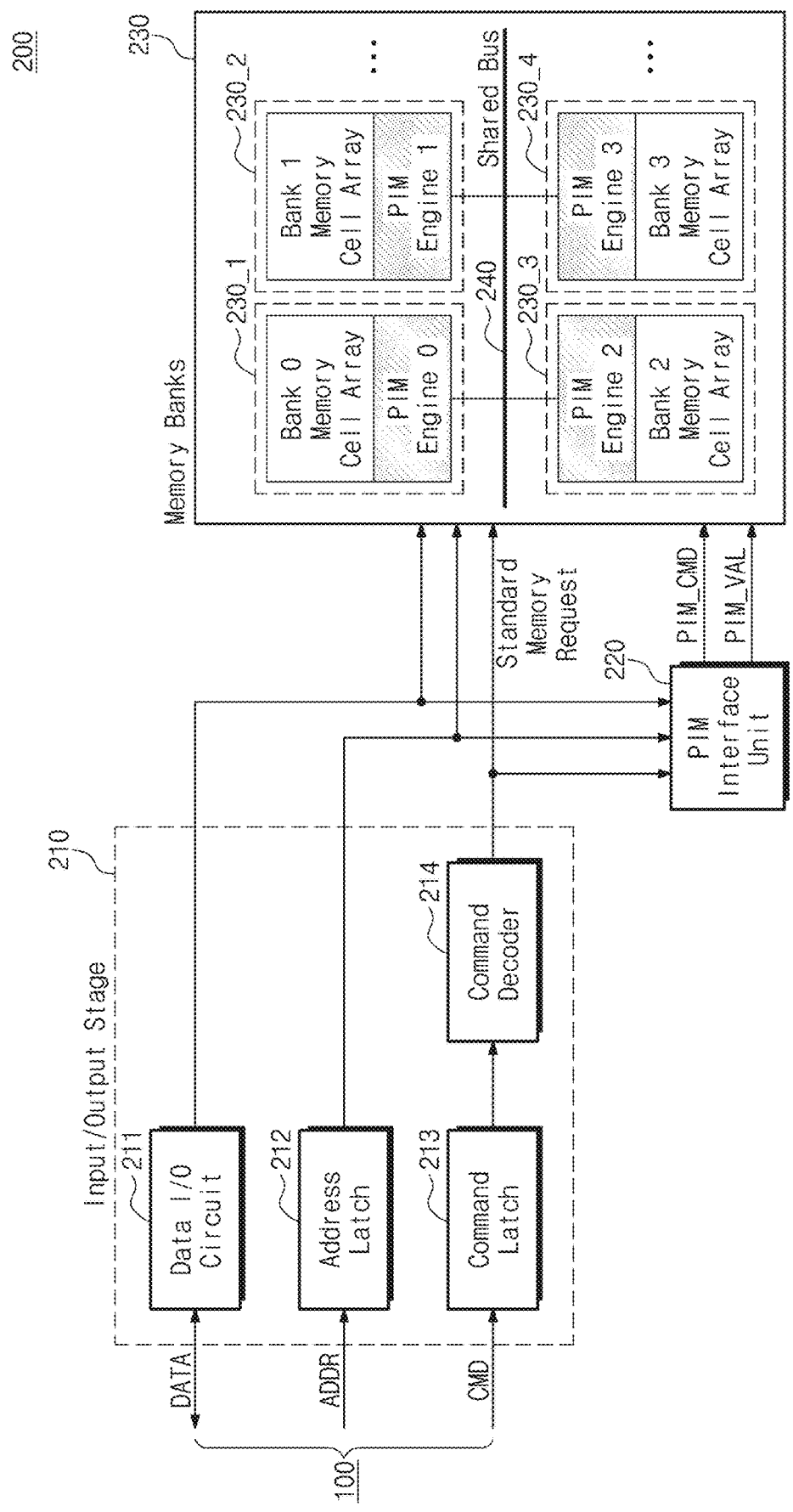
FIG. 2 illustrates an example of a configuration of the memory device of FIG. 1.

FIG. 2 illustrates an example of a configuration of the memory device 200 of FIG. 1. The memory device 200 includes an input/output terminal 210, a processing in-memory interface unit (PIM IU) 220, a plurality of memory banks 230, and a shared bus 240. The memory device 200 of FIG. 2 is shown to include the plurality of memory banks 230. However, the present disclosure is not limited thereto. For example, the memory device 200 may include one memory bank.

The input/output terminal 210 may receive signals including the data DATA, the address ADDR, and the command CMD from the memory controller 100 of FIG. 1 and may include a data input/output circuit 211, an address latch 212, a command latch 213, and a command decoder 214. The data input/output circuit 211 may provide the data DATA received from the memory controller 100 to the PIM IU 220 or the plurality of memory banks 230, and may output the data DATA, which is received from the PIM IU 220 or the plurality of memory banks 230, to the memory controller 100.

The address latch 212 may generate a latch signal based on the address ADDR and may provide the latch signal to the PIM IU 220 or the plurality of memory banks 230. The command latch 213 may generate a latch signal based on the command CMD and may provide the latch signal to the command decoder 214. The command decoder 214 may decode the latch signal and may provide the decoded result to the PIM IU 220 or the plurality of memory banks 230.

The PIM IU 220 may generate a signal for an in-memory operation request in response to signals received from the input/output terminal 210 and may output the signal for an in-memory operation request to the plurality of memory banks 230. For example, the signal for an in-memory operation request may include a PIM command signal PIM_CMD for specifying the type of the operation, which is performed in the memory bank, and a PIM valid signal PIM_VAL for determining whether to broadcast data of a memory bank corresponding to address information (e.g., a latch signal of the address ADDR).

The plurality of memory banks 230 may perform an operation on operand data based on the PIM command signal PIM_CMD and the PIM valid signal PIM_VAL that are output from the PIM IU 220. Each of the plurality of memory banks (e.g., 230_1, 230_2, 230_3, 230_4, . . . ) may be connected through the shared bus 240. Hereinafter, a configuration and operation of the other memory banks (e.g., 230_2, 230_3, 230_4, . . . ) are the same as those of the memory bank 230_1, and thus a configuration and operation of only the memory bank 230_1 will be described.

The operation performed by the memory bank 230_1 may be performed based on an operator and an operand. For example, the operator may include various types of operators, such as multiply-and-accumulation, addition, subtraction, multiplication, and the like. For example, the operand may include an operand stored in the memory bank 230_1 or an operand broadcast sequentially from each of the plurality of memory banks (e.g., 230_1, 230_2, 230_3, 230_4 . . . ).

The memory bank 230_1 may include a memory cell array for storing an operand and a PIM engine for performing an operation on the operand. For clear description, the operand stored in a memory bank is referred to as "first operand data". The operand broadcast sequentially from each of memory banks is referred to as "second operand data".

The first operand data and the second operand data may include pieces of first unit data and a plurality of second unit data, respectively. Here, the "unit" may indicate each group when operand data includes a plurality of element data capable of being grouped depending on logical and mathematical criteria. For example, when the operand data is a matrix, unit data may be a row or column of the matrix, and element data may be each element of the matrix.

The second operand data may be stored in a memory cell array among the plurality of memory banks 230. In this case, the second operand data may be read from a memory cell array among the plurality of memory banks 230 and may be broadcast to the remaining memory banks. Furthermore, the second operand data may be provided from the outside of the memory device 200.

Figure 3:
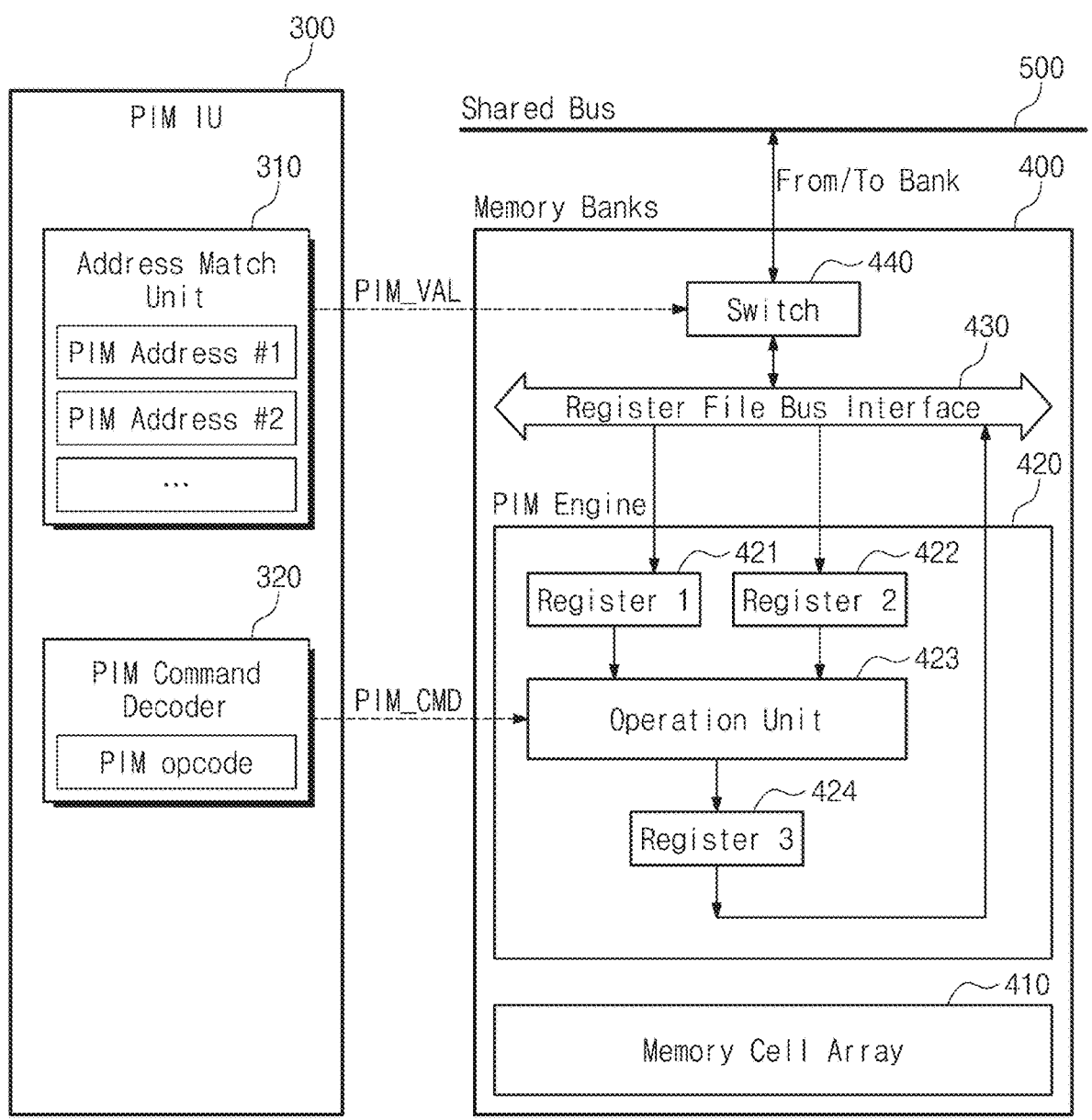
FIG. 3 shows an example of a configuration of a PIM IU and the memory bank of FIG. 2.

FIG. 3 shows an example of a configuration of the PIM IU 220 and the memory bank 230_1 of FIG. 2. For example, a PIM IU 300 of FIG. 3 may be the PIM IU 220 of FIG. 2, and a memory bank 400 may be one (e.g., 230_1) of the plurality of memory banks of FIG. 2. Also, the shared bus 500 of FIG. 3 may be the shared bus 240 of FIG. 2.

The PIM IU 300 may include an address match unit 310 and a PIM command decoder 320 for the purpose of generating a signal for an in-memory operation request. For example, the address match unit 310 may store pieces of PIM address information (e.g., PIM address #1, PIM address #2, . . . ), and some of the pieces of PIM address information may be broadcasting address information. The address match unit 310 may receive address information (e.g., a latch signal of the address ADDR output from the address latch 212 in FIG. 2) from the input/output terminal 210 in FIG. 2 and may generate the PIM valid signal PIM_VAL indicating whether the address information matches broadcasting address information, by comparing the address information with the pre-stored broadcasting address information.

In other words, the address match unit 310 may determine whether to broadcast data of a memory bank corresponding to the address information received from the input/output terminal 210 in FIG. 2. The PIM valid signal PIM_VAL may indicate the determination result. For example, when there is no broadcasting address information matching the address information, the PIM valid signal PIM_VAL may indicate that data of the memory bank corresponding to the address information is not broadcast, and may be expressed as "PIM_VAL=0" (i.e., a low level). On the other hand, when the broadcasting address information matching address information is present, the PIM valid signal PIM_VAL may indicate that data of memory bank corresponding to address information is broadcast, and may be expressed as "PIM_VAL=1" (i.e., a high level). The address match unit 310 may output the PIM valid signal PIM_VAL to a switch 440.

The PIM command decoder 320 may generate the PIM command signal PIM_CMD indicating the type (e.g., multiply-and-accumulation, addition, subtraction, multiplication, or the like) of an operation that is to be performed by an operation unit 423. The PIM command decoder 320 may store a command code PIM opcode for generating the PIM command signal PIM_CMD and may generate the PIM command signal PIM_CMD based on the stored command code PIM opcode and the decoded result output from the command decoder 214 in FIG. 2. The PIM command decoder 320 may output the PIM command signal PIM_CMD to the operation unit 423.

The memory bank 400 may include a memory cell array 410, a PIM engine 420, a register file bus interface 430, and the switch 440. The memory cell array 410 may store one of pieces of first unit data included in first operand data. For example, as illustrated in FIG. 2, when the memory device 200 includes the plurality of memory banks 230, a memory cell array included in each of the memory bank (e.g., 230_1, 230_2, 230_3, 230_4, . . . ) may store one of the pieces of first unit data so as not to overlap each other. For example, when the first operand data is matrix A, and the first unit data indicates a column of matrix A, each memory cell array may store a different column of matrix A.

While reading one of the pieces of first unit data from the memory cell array 410 and sequentially reading the pieces of second unit data included in the second operand data, the PIM engine 420 may generate an operation result by performing an operation on the one of the pieces of first unit data. To perform an operation and to store the operation result, the PIM engine 420 may include a first register 421, a second register 422, the operation unit 423, and a third register 424. However, the present disclosure is not limited thereto. For example, the PIM engine 420 may include the number of registers different from the number of registers shown in FIG. 3.

The first register 421 may store one of the pieces of first unit data. In detail, the first register 421 may read and store one of the pieces of first unit data stored in the memory cell array 410 through the register file bus interface 430. For example, when the first operand data is matrix A, and the first unit data indicates a column of matrix A, the first register 421 may store one of a plurality of columns of matrix A.

The second register 422 may read and store pieces of second unit data, which is broadcast, through the register file bus interface 430. For example, the pieces of second unit data may be broadcast from a memory cell array of a memory bank where the second operand data is stored or may be broadcast from the outside of the memory device 200. For example, when the second operand data is 'B' and the second unit data indicates a column of matrix B, all columns of matrix B may be sequentially broadcast to the memory bank 400 or may be stored in the second register 422.

The operation unit 423 may receive one of the pieces of first unit data from the first register 421 and may receive pieces of second unit data from the second register 422. Next, the operation unit 423 may perform an operation and may generate the operation result. For example, the operation unit 423 may be an arithmetic logic unit (ALU). In addition, for simplicity of illustration, the memory bank 400 of FIG. 3 is shown to include the single operation unit 423. However, the present disclosure is not limited thereto. For example, the memory bank 400 may include a plurality of operation units. For example, the memory bank 400 may include the same number (e.g., the number of elements included in a column of matrix A) of operation units as the number of first element data included in the first unit data.

The operation unit 423 may determine an operator (i.e., the type of an operation, for example, multiply-and-accumulation, addition, subtraction, multiplication, or the like) based on the PIM command signal PIM_CMD output from the PIM command decoder 320. In some cases, the type of the operation may be preset depending on the architecture of the memory device. Whenever the pieces of second unit data are sequentially stored in the second register 422 (i.e., whenever the pieces of second unit data are sequentially broadcast), the operation unit 423 may perform an operation. The third register 424 may receive the operation result from the operation unit 423 and may accumulate and store the operation result.

The switch 440 may switch an electrical connection between the PIM engine 420 and the shared bus 500 in response to the PIM valid signal PIM_VAL output from the address match unit 310. For example, when the PIM valid signal PIM_VAL indicates that data needs to be broadcast from a specific memory bank (i.e., when the broadcasting address information matching the address information corresponding to a specific memory bank is stored in the address match unit 310), the switch 440 may connect the PIM engine 420 to the shared bus 500. Afterward, the second register 422 may store the pieces of second unit data that are sequentially broadcast through the shared bus 500.

Hereinafter, a specific operation (i.e., an in-memory operation) performed in the memory device 200 of FIG. 1 of the present disclosure will be described with reference to FIGS. 4 to 6. Moreover, for clear description, hereinafter, it is assumed that each of the first operand data and the second operand data is a matrix. It is assumed that the type of an operation performed is matrix multiplication. However, the present disclosure is not limited thereto. For example, the first operand data, the second operand data, and the type of an operation may be variously implemented.

FIG. 4 shows an example of an in-memory operation, according to an embodiment of the present disclosure. The operation shown in FIG. 4 is matrix multiplication, matrix A of "32×32" is second operand data, matrix B of "32×16" is first operand data, and multiply-and-accumulation is an operator. In this case, the size of matrix C, which is the result of matrix multiplication, is "32×16". Each column of matrix A that is the second operand data is second unit data. Each column of matrix B that is the first operand data is first unit data. Moreover, each element of matrix A is first element data, and each element of matrix B is second element data. Furthermore, it is assumed that each of the data type of matrix A and the data type of matrix B is bfloat16. It is assumed that the capacity of each element is 2 bytes.

For example, a first register of each of memory banks Bank0 to Bank15 shown in FIG. 4 may store columns 1 to 16 (i.e., first unit data) of matrix B, respectively. All columns (i.e., second unit data) of matrix A may be sequentially broadcast depending on broadcasting periods T0 to T31 and may be stored in a second registers of each of the plurality of memory banks Bank0 to Bank15. For example, assuming that the memory bank 400 of FIG. 3 is bank Bank0, the first register 421 may store column 1 of matrix B, and all columns of matrix A may be sequentially broadcast and stored in the second register 422. That is, the operation shown in FIG. 4 is column-wise matrix multiplication.

Figure 5:
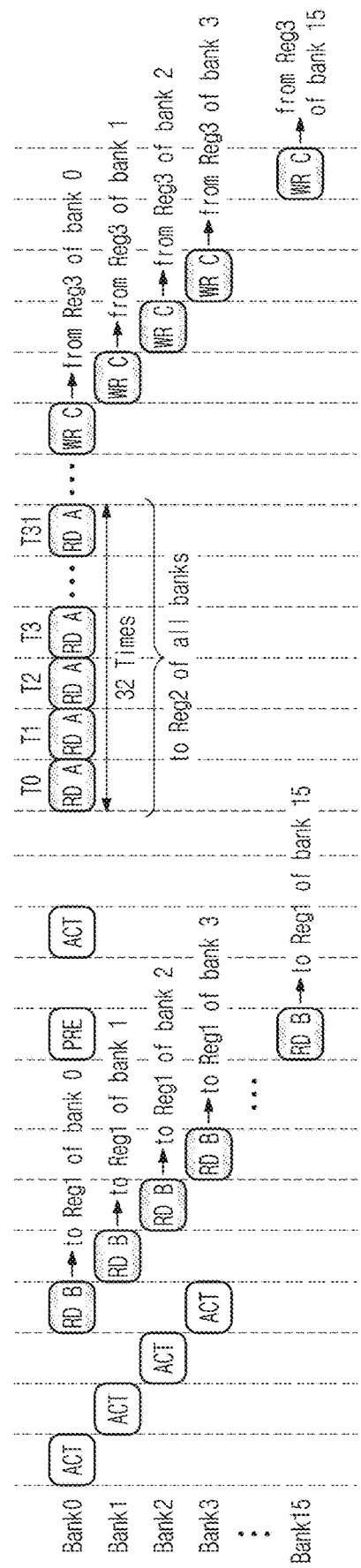
FIG. 5 shows an in-memory operation process of FIG. 4 in time series.

FIG. 5 shows an in-memory operation process of FIG. 4 in time series. FIG. 6 shows an in-memory operation process of FIG. 4 for each memory bank. Referring to FIG. 5, each of the memory banks Bank0 to Bank15 may be sequentially activated in response to an ACT signal for activation. After a predetermined time has elapsed after each of the memory banks Bank0 to Bank15 is activated, each of the memory banks Bank0 to Bank15 may read (RD B) each column (i.e., columns 1 to 16 that are respective first unit data of first operand data) of matrix B from a memory cell array in response to a RD signal and may store each column in a first register. For example, assuming that the memory bank 400 of FIG. 3 is bank Bank0, when a predetermined time has elapsed after the memory bank 400 is activated, the memory bank 400 may read column 1 of matrix B from the memory cell array 410 and store column 1 in the first register 421.

After each column of matrix B is stored in the first register of each of the banks, all banks may be pre-charged in response to a PRE signal, and may be activated again in response to an ACT signal. For brevity of illustration, FIG. 5 illustrates that the PRE signal and the ACT signal received after the RD signal are associated with only bank Bank0. It will be understood that the memory banks Bank0 to Bank15 also receive the PRE signal and the ACT signal.

Afterward, each column (i.e., second unit data) of matrix A may be broadcast (RD A) sequentially (i.e. column-wise) to all the memory banks Bank0 to Bank15 in response to the RD signal for each of time intervals T0 to T31 in a broadcasting period or may be stored in the second register of each memory bank. That is, each column of matrix A may be an operand shared by all of the memory banks. Each column of matrix A may be broadcast to all memory banks and may be stored in the corresponding second register.

While the second unit data is stored in the second register, operation units included in each of the memory banks Bank0 to Bank15 may perform operations at the same time. Referring to FIG. 6, each of the memory banks Bank0 to Bank15 may include operation units, of which the number (i.e., 32 operation units ALU0 to ALU31 in this case) is the same as the number (i.e., the number of pieces of first element data included in the first unit data) of elements included in each column of matrix B. At each of time intervals T0 to T31, each of operation units ALU0 to ALU31 of each memory bank receives one element of one of a plurality of columns of matrix B stored in a first register and one element of one of a plurality of columns of matrix A stored in a second register and then may perform an operation.

At all of the time intervals, columns 1 to 16 of matrix B may be stored in the first registers of the memory banks Bank0 to Bank15, respectively. At each of the first to 32nd time intervals T0 to T31, columns 1 to 32 of matrix A may be broadcast and stored in the second registers of all banks, respectively. That is, as described above, columns 1 to 32 of matrix A may correspond to operands shared by all banks. Moreover, at each time interval, the operation units of each bank may multiply an element of matrix B stored in the first register and an element of matrix A stored in the second register, may accumulate the calculated result, and may store the accumulated result in the third register.

For example, at the first time interval T0, the operation units ALU0 to ALU31 of bank Bank 0 may generate $a_{0,0}b_{0,0}$, $a_{1,0}b_{0,0}$, ..., and $a_{31,0}b_{0,0}$ by multiplying a first element $b_{0,0}$ of column 1 of matrix B stored in the first register and each of elements $a_{0,0}$ to $a_{31,0}$ of column 1 of matrix A stored in the second register and may store $a_{0,0}b_{0,0}$, $a_{1,0}b_{0,0}$, ..., and $a_{31,0}b_{0,0}$ as $psum_{0,0}$, $psum_{1,0}$, ..., and $psum_{31,0}$ in the third register. Also, the operation units ALU0 to ALU31 of bank Bank 1 may generate $a_{0,0}b_{0,1}$, $a_{1,0}b_{0,1}$, ..., and $a_{31,0}b_{0,1}$ by multiplying a first element $b_{0,1}$ of column 2 of matrix B stored in the first register and each of elements $a_{0,0}$ to $a_{31,0}$ of column 1 of matrix A stored in the second register and may store $a_{0,0}b_{0,1}$, $a_{1,0}b_{0,1}$, ..., and $a_{31,0}b_{0,1}$ as $psum_{0,1}$, $psum_{1,1}$, ..., and $psum_{31,1}$ in the third register. Likewise, as for banks Bank 2 to Bank 15, operations may be performed between elements in each of the columns 3 to 16 of matrix B and elements in column 1 of matrix A.

Next, at the second time interval T1, the operation units ALU0 to ALU31 of bank Bank 0 may generate $a_{0,1}b_{1,0}$, $a_{1,1}b_{1,0}$, ..., and $a_{31,1}b_{1,0}$ by multiplying a second element $b_{1,0}$ of column 1 of matrix B stored in the first register and each of elements $a_{0,1}$ to $a_{31,1}$ of column 2 of matrix A stored in the second register and may accumulate the multiplied result in $psum_{0,0}$, $psum_{1,0}$, ..., and $psum_{31,0}$ calculated at the first time interval T0. Moreover, the operation unit ALU0 to ALU31 of the bank Bank 1 may multiply a second element $b_{1,1}$ of column 2 of matrix B stored in the first register and each of element $a_{0,1}$ to $a_{31,1}$ of column 2 of matrix A stored in the second register and may accumulate the multiplied result in $psum_{0,1}$, $psum_{1,1}$, ..., and $psum_{31,1}$. Likewise, as for banks Bank 2 to Bank 15, operations may be performed between elements in each of the columns 3 to 16 of matrix B and elements in column 2 of matrix A. The operations may be repeatedly performed in all banks until the last time interval T31.

Finally, after the last time interval T31 has passed, elements of matrix C, which the result of matrix multiplication, may be stored in the third registers of all banks. Returning to FIG. 5, after operations of all of the banks Bank0 to Bank15 at all the time intervals T0 to T31 are finished, the result of matrix multiplication stored in the third register may be written to a memory cell array (i.e., an address of matrix C) in response to a WR signal (WR C).

Figure 6:
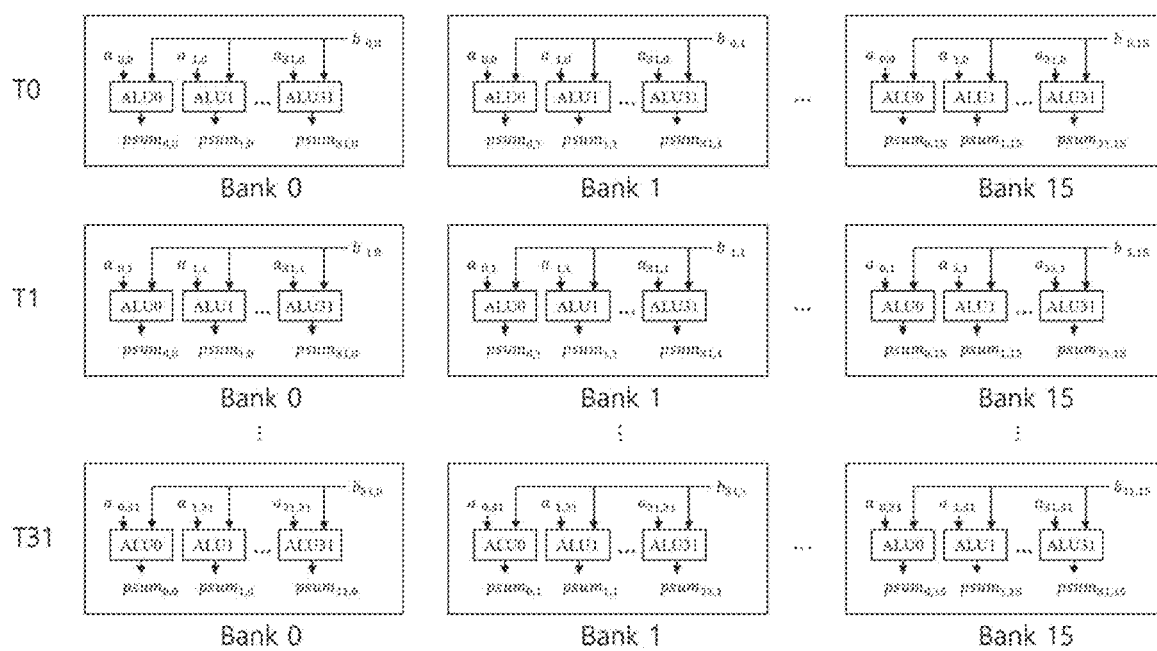
FIG. 6 shows an in-memory operation process of FIG. 4 for each memory bank.
Figure 7:
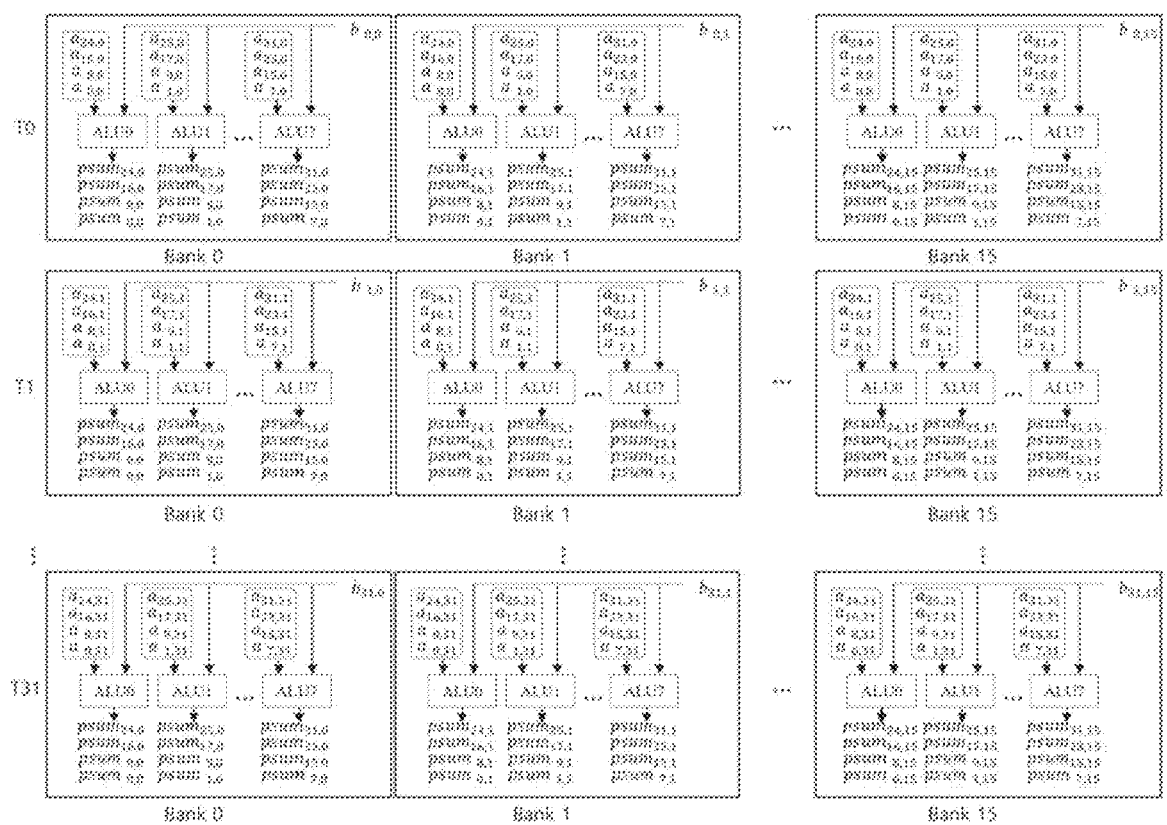
FIG. 7 illustrates an in-memory operation process for each memory bank, according to an embodiment of the present disclosure.

FIGS. 5 and 6 illustrate that a memory bank includes the same number of operation units (i.e., 32 operation units ALU0 to ALU31) as the number of elements in each column of matrix B and each of the operation units performs an operation on one element of matrix A and one element of matrix B. However, the present disclosure is not limited thereto. In an embodiment, a memory bank may include operation units of which the number fewer than the number of elements in each column of matrix B. FIG. 7 illustrates an in-memory operation process for each memory bank, according to an embodiment of the present disclosure.

Referring to FIG. 7, each of the banks Bank0 to Bank15 may include the 8 operation units ALU0 to ALU7. Each of the operation units ALU0 to ALU7 may perform an operation on four elements of each column of matrix A and one element of each column of matrix B, may generate four results, and may accumulate the four results at each of the time intervals T0 to T31. The detailed operation process is the same as that described with reference to FIG. 6, and thus the detailed operation process will be omitted to avoid redundancy.

Figure 8B:
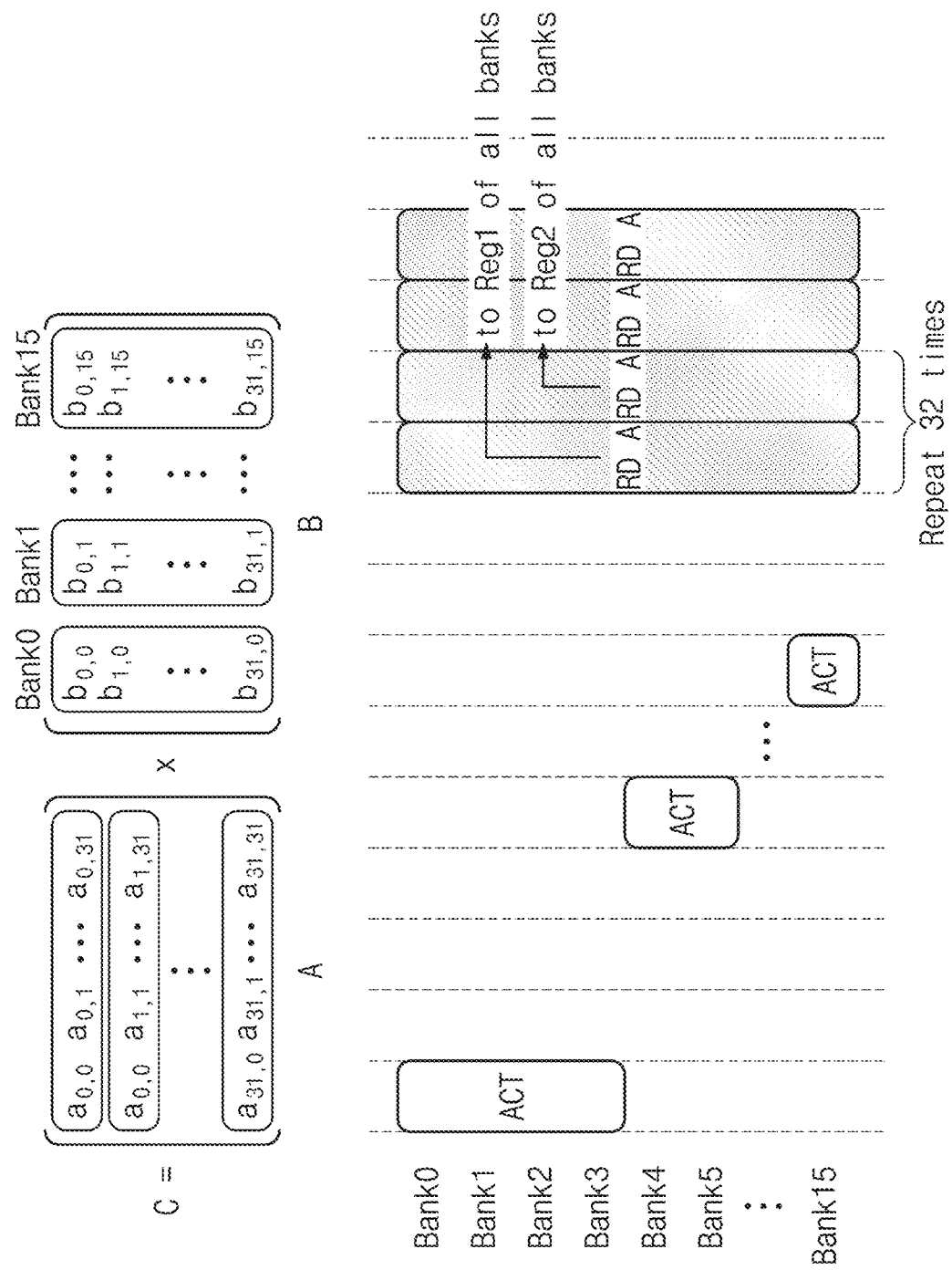
FIG. 8B shows an example of an all-bank in-memory operation.

FIG. 8A shows an example of a per-bank in-memory operation. FIG. 8B shows an example of an all-bank in-memory operation. Unlike the column-wise matrix multiplication described with reference to FIGS. 4 to 6, the matrix multiplication of matrix A and matrix B shown in FIGS. 8a and 8b may be performed through an operation on each row of matrix A and each column of matrix B.

Referring to FIG. 8A, in the per-bank in-memory operation, row 1 of matrix A may be first stored in first registers of all of the banks. Columns of matrix B may be stored in second registers of banks Bank0 to Bank15, respectively. An operation may be performed between row 1 of matrix A and each column of matrix B. Afterward, this operation may be repeated up to row 32 of matrix A.

That is, as a general method of matrix multiplication in the per-bank in-memory operation, operations may be sequentially performed on each row of matrix A and each column of matrix B. Because operations of each bank are sequentially performed, the execution time thereof may be longer than that of the operation method described with reference to FIGS. 4 to 6.

Referring to FIG. 8B, unlike the per-bank in-memory operation of FIG. 9A, in the all-bank in-memory operation, a read operation may be performed in all banks in response to a RD signal and then an operation may be performed. In other words, row 1 of matrix A may be simultaneously stored in the first registers of all banks. Columns of matrix B may be simultaneously stored in the second registers of banks Bank0 to Bank15, respectively. An operation may be simultaneously performed between row 1 of matrix A and each column of matrix B. Afterward, this operation may be repeated up to row 32 of matrix A.

As for the all-bank in-memory operation, operations are simultaneously performed in all of the banks. Accordingly, as compared with the per-bank in-memory operation, the execution time may be short, but high power may be consumed. Also, the all-bank in-memory operation may be performed only when a memory controller supports simultaneous operation of all memory banks.

Figure 9:
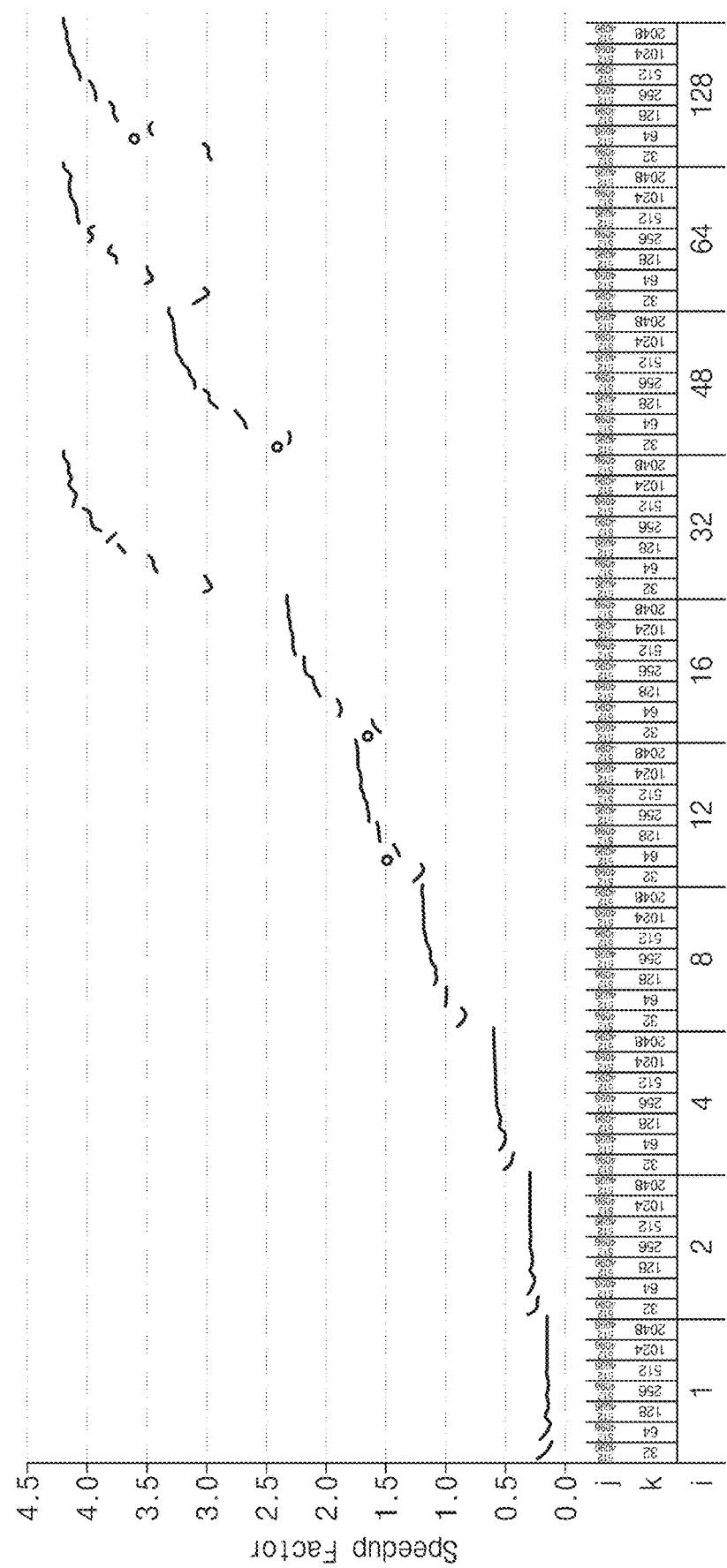
FIG. 9 shows a simulation result for comparing an execution speed of a per-bank in-memory operation of FIG. 8A with a speed of an in-memory operation, according to an embodiment of the present disclosure.

FIG. 9 shows a simulation result of comparing an execution speed of a per-bank in-memory operation of FIG. 8A with a speed of an in-memory operation, according to an embodiment of the present disclosure. Specifically, referring to FIG. 9, assuming that the number of rows in matrix A is 'i', the number of columns in matrix A is 'k', the number of rows in matrix B is 'k', and the number of columns in matrix B is 'j' ('i'=1, 2, 4, 8, 12, 16, 32, 48, 64, or 128, 'j'=512, 1024, 2048, or 4096, and 'k'=32, 64, 128, 256, 512, 1024, or 2048), it is shown how the execution speed of the in-memory operation according to an embodiment of the present disclosure is faster than the execution speed of the per-bank in-memory operation according to FIG. 8A (a speedup factor). In general, it is shown that the execution speed of the in-memory operation according to the embodiment of the present disclosure is faster than the execution speed of the per-bank in-memory operation, as values of 'i', 'j', and 'k' increase.

Figure 10:
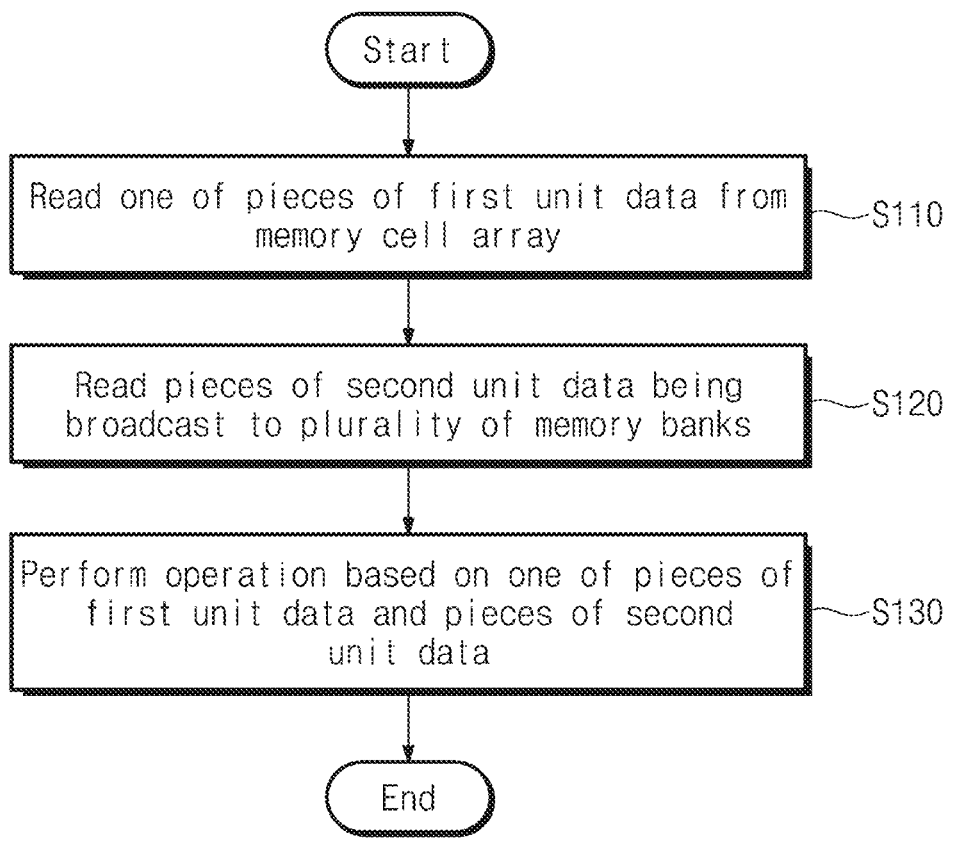
FIG. 10 is a flowchart illustrating an example of a method for performing an in-memory operation, according to an embodiment of the present disclosure.

FIG. 10 is a flowchart illustrating an example of a method for performing an in-memory operation, according to an embodiment of the present disclosure. Hereinafter, the method will be described with reference to FIG. 3 together with FIG. 10.

In operation S110, the memory bank 400 may read one of pieces of first unit data included in first operand data from the memory cell array 410. The memory bank 400 may store one of the pieces of first unit data, which is read, in the first register 421. In operation S120, the memory bank 400 may read pieces of second unit data included in second operand data thus sequentially broadcast. The memory bank 400 may store the pieces of second unit data, which is read, in the second register 422.

In operation S130, the memory bank 400 may perform an operation based on one of the pieces of first unit data and the pieces of second unit data. In detail, at each time interval (e.g., T0 to T31 in FIGS. 4 to 7) in a broadcasting period, the operation unit 423 of the memory bank 400 may receive one of the pieces of first element data included in one of the pieces of first unit data stored in the first register 421, may receive pieces of second element data including the pieces of second unit data stored in the second register 422, and may generate an operation result by performing and accumulating an operation based on one of the pieces of first element data and pieces of second element data. Afterward, the memory bank 400 may store the operation result in the third register 424.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure.

While the present disclosure has been described with reference to embodiments thereof, it will be apparent to those of ordinary skill in the art that various changes and modifications may be made thereto without departing from the spirit and scope of the present disclosure as set forth in the following claims.

According to an embodiment of the present disclosure, it is possible to minimize a memory request for reading an operand, thereby improving the performance of in-memory operation and reducing power consumption.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
   a plurality of memory banks each configured to perform an operation based on first operand data including pieces of first unit data and second operand data including pieces of second unit data; and
   a processing in-memory interface unit (PIM IU) configured to deliver signals for an operation request to the plurality of memory banks,
   wherein each of the plurality of memory banks includes,
      a memory cell array configured to store one of the pieces of first unit data, and
      a PIM engine configured to,
         read the one of the pieces of first unit data from the memory cell array,
         receive the pieces of second unit data broadcast from any one memory bank among to the plurality of memory banks to the remaining memory banks, and
         generate an operation result by performing an operation based on the one of the pieces of first unit data and the pieces of second unit data, and
   wherein the PIM engine configured to perform the operation based on the one of the pieces of first unit data and the pieces of second unit data, after all of the pieces of first unit data are read from all of the plurality of memory banks and the pieces of second unit data are received.

2. The memory device of claim 1, wherein the PIM engine includes:
   a first register configured to read and store the one of the pieces of first unit data from the memory cell array;
   a second register configured to read and store the pieces of second unit data thus broadcast;
   an operation unit configured to generate the operation result by performing the operation based on the one of the pieces of first unit data and the pieces of second unit data; and
   a third register configured to store the operation result.

3. The memory device of claim 2, wherein, in a broadcasting period including a plurality of time intervals, the pieces of second unit data are sequentially broadcast from any one memory bank among the plurality of memory banks to the remaining memory banks at each of the time intervals, respectively.

4. The memory device of claim 3, wherein each of the pieces of first unit data includes pieces of first element data, and each of the pieces of second unit data includes pieces of second element data, and
   wherein, at each of the time intervals, the operation unit receives the one of the pieces of first element data stored in the first register, receives the pieces of second element data stored in the second register, and generates the operation result by performing and accumulating the operation based on the one of the pieces of first element data and the pieces of second element data.

5. The memory device of claim 1, wherein the PIM IU includes,
   an address match unit configured to receive address information from a memory controller and to generate a PIM valid signal for determining whether to broadcast data of a memory bank corresponding to the address information, by comparing the address information with broadcasting address information thus previously stored, and
   a PIM command decoder configured to generate a PIM command signal indicating a type of the operation performed by the PIM engine, and
   each of the plurality of memory banks further includes a switch that switches an electrical connection of the PIM engine and a shared bus in response to the PIM valid signal.

6. The memory device of claim 5, wherein, when the address information matches the broadcasting address information, the PIM valid signal has a high level,
   wherein, when the address information does not match the broadcasting address information, the PIM valid signal has a low level, and
   wherein the switch electrically connects the PIM engine to the shared bus in response to the PIM valid signal of a high level.

7. The memory device of claim 1, wherein each of the pieces of first unit data is stored in the memory cell array of each of the plurality of memory banks so as not to overlap with each other.

8. The memory device of claim 1, further comprising:
   an input/output terminal configured to receive signals including data, an address, and a command from a memory controller.

9. The memory device of claim 8, wherein the input/output terminal includes:
   a data input/output circuit configured to provide data received from the memory controller to the PIM IU or the plurality of memory banks or to output data received from the PIM IU or the plurality of memory banks to the memory controller;
   an address latch configured to generate address information based on the address and to provide the address information to the PIM IU or the plurality of memory banks;
   a command latch configured to generate a latch signal based on the command; and
   a command decoder configured to decode the latch signal and to provide the decoded result to the PIM IU or the plurality of memory banks.

10. A memory device comprising:
    a plurality of memory banks, each of which performs matrix multiplication on a first matrix including a plurality of first columns and a second matrix including a plurality of second columns; and
    a PIM IU configured to deliver signals for an operation request to the plurality of memory banks,
    wherein each of the plurality of memory banks includes,
       a memory cell array configured to store one of the plurality of first column, and
       a PIM engine configured to,
          read the one of the plurality of first columns from the memory cell array, receive the plurality of second columns broadcast from any one memory bank among the plurality of memory banks to the remaining memory banks, and generate an operation result by performing an operation based on the one of the plurality of first columns and the plurality of second columns, and wherein the operation based on the one of the plurality of first columns and the plurality of second columns is performed after all of the plurality of first columns are read from all of the plurality of memory banks and the plurality of second columns are received.

11. The memory device of claim 10, wherein the PIM engine includes:
a first register configured to read and store the one of the plurality of first columns from the memory cell array;
a second register configured to read and store the plurality of second columns thus broadcast;
one or more operation units configured to generate the operation result by performing the operation based on the one of the plurality of first columns and the plurality of second columns; and
a third register configured to store the operation result.

12. The memory device of claim 11, wherein, in a broadcasting period including a plurality of time intervals, the plurality of second columns are sequentially broadcast to the plurality of memory banks at each of the time intervals, respectively.

13. The memory device of claim 12, wherein each of the plurality of first columns includes a plurality of first elements, and each of the plurality of second columns includes a plurality of second elements,
wherein a number of the one or more operation units is identical to the number of the plurality of first elements included in each of the plurality of first columns, and
wherein, at each of the time intervals, each of the one or more operation units receives the one of the plurality of first elements stored in the first register, receives one of the plurality of second elements stored in the second register, generates a multiplication result by multiplying the one of the plurality of first elements and the one of the plurality of second elements, and generates the operation result by accumulating the multiplication result.

14. The memory device of claim 12, wherein each of the plurality of first columns includes a plurality of first elements, and each of the plurality of second columns includes a plurality of second elements, and
wherein, at each of the time intervals, each of the one or more operation units receives the one of the plurality of first elements stored in the first register, receives some elements of the plurality of second elements stored in the second register, generates a multiplication result by multiplying the one of the plurality of first elements and each of the some elements of the plurality of second elements, and generates the operation result by accumulating the multiplication result.

15. The memory device of claim 10, wherein
the PIM IU includes,
an address match unit configured to receive address information from a memory controller and to generate a PIM valid signal for determining whether to broadcast data of a memory bank corresponding to the address information, by comparing the address information with broadcasting address information thus previously stored, and a PIM command decoder configured to generate a PIM command signal indicating a type of the operation performed by the PIM engine, and
each of the plurality of memory banks further includes a switch that switches an electrical connection of the PIM engine and a shared bus in response to the PIM valid signal.

16. The memory device of claim 15, wherein, when the address information matches the broadcasting address information, the PIM valid signal has a high level,
wherein, when the address information does not match the broadcasting address information, the PIM valid signal has a low level, and
wherein the switch electrically connects the PIM engine to the shared bus in response to the PIM valid signal of a high level.

17. The memory device of claim 10, wherein each of the plurality of first columns is stored in the memory cell array of each of the plurality of memory banks so as not to overlap with each other.

18. A method for performing an operation based on first operand data including pieces of first unit data and second operand data including pieces of second unit data, the method comprising:
reading one of the pieces of first unit data from a memory cell array;
receiving the pieces of second unit data broadcast from any one memory bank among a plurality of memory banks to the remaining memory banks; and
performing an operation based on the one of the pieces of first unit data and the pieces of second unit data,
wherein the operation based on the one of the pieces of first unit data and the pieces of second unit data is performed after all of the pieces of first unit data are read from all of the plurality of memory banks and the pieces of second unit data are received.

19. The method of claim 18, wherein
each of the plurality of memory banks includes a first register, a second register, a third register, and an operation unit, and
wherein the performing of the operation includes,
storing the one of the pieces of first unit data in the first register,
storing the pieces of second unit data in the second register,
generating, by the operation unit, an operation result by performing the operation based on the one of the pieces of first unit data and the pieces of second unit data, and
storing the operation result in the third register.

20. The method of claim 19, wherein
each of the pieces of first unit data includes pieces of first element data, and each of the pieces of second unit data includes pieces of second element data, and
wherein the performing of the operation includes
in a broadcasting period including a plurality of time intervals, at each of the time intervals,
receiving the one of the pieces of first element data stored in the first register,
receiving the pieces of second element data stored in the second register, and
generating the operation result by performing and accumulating the operation based on the one of the pieces of first element data and the pieces of second element data.

* * * * *